United States Patent
Saitou et al.

(10) Patent No.: US 11,005,099 B2
(45) Date of Patent: May 11, 2021

(54) NONAQUEOUS ELECTROLYTE SECONDARY BATTERY

(71) Applicant: PANASONIC INTELLECTUAL PROPERTY MANAGEMENT CO., LTD., Osaka (JP)

(72) Inventors: Motoharu Saitou, Hyogo (JP); Yoshinori Aoki, Hyogo (JP); Takeshi Ogasawara, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 421 days.

(21) Appl. No.: 16/086,091

(22) PCT Filed: Feb. 7, 2017

(86) PCT No.: PCT/JP2017/004307
§ 371 (c)(1),
(2) Date: Sep. 18, 2018

(87) PCT Pub. No.: WO2017/169129
PCT Pub. Date: Oct. 5, 2017

(65) Prior Publication Data
US 2020/0295365 A1  Sep. 17, 2020

(30) Foreign Application Priority Data
Mar. 31, 2016 (JP) .................. JP2016-071007

(51) Int. Cl.
*H01M 4/525* (2010.01)
*C01G 53/00* (2006.01)
(Continued)

(52) U.S. Cl.
CPC .......... *H01M 4/525* (2013.01); *C01G 53/42* (2013.01); *H01M 10/0525* (2013.01);
(Continued)

(58) Field of Classification Search
CPC ................... H01M 4/525; C01G 53/44
See application file for complete search history.

(56) References Cited

U.S. PATENT DOCUMENTS 8,962,195 B2 * 2/2015 Shizuka ............. H01M 4/5815
429/322
9,106,031 B2 * 8/2015 Golko .................... H01R 25/00
(Continued)

FOREIGN PATENT DOCUMENTS

JP  11-510467 A  9/1999
JP  2005053764 A * 3/2005
(Continued)

OTHER PUBLICATIONS

Machine translation of JP-2005053764-A (no date).*
(Continued)

*Primary Examiner* — Amanda C. Walke
(74) *Attorney, Agent, or Firm* — Westerman, Hattori, Daniels & Adrian, LLP

(57) ABSTRACT

A nonaqueous electrolyte secondary battery includes a positive electrode containing a positive electrode active material, a negative electrode, and a nonaqueous electrolyte. The positive electrode active material includes lithium nickel complex oxide, and the lithium nickel oxide has a layered rock-salt structure and is represented by a composition formula of $Li_xNi_yM_zO_2$ (where M is at least one metal element selected from the group consisting of Co, Al, Mg, Ca, Cr, Zr, Mo, Si, Ti, and Fe, and x, y, and z satisfy $0.95 \leq x \leq 1.05$, $0.8 \leq y \leq 1$, $0 \leq z \leq 0.2$, and $y+z=1$). A half width n of a (104) diffraction peak in an X-ray diffraction pattern is 0.13° or less, and the content of the positive electrode active material with a particle size of 3.41 μm or less is 2 volume % or less based on a total amount of the positive electrode active material contained in the positive electrode.

3 Claims, 6 Drawing Sheets

(51) Int. Cl.
*H01M 10/0525* (2010.01)
*H01M 4/02* (2006.01)

(52) U.S. Cl.
CPC ...... *C01P 2002/74* (2013.01); *C01P 2006/40* (2013.01); *C01P 2006/90* (2013.01); *H01M 2004/028* (2013.01)

(56) References Cited

U.S. PATENT DOCUMENTS

| | | | | |
|---|---|---|---|---|
| 9,543,055 | B2* | 1/2017 | Endo | C01G 45/1228 |
| 10,050,267 | B2* | 8/2018 | Nakayama | C01G 53/50 |
| 2003/0170540 | A1* | 9/2003 | Ohzuku | H01M 4/525 |
| | | | | 429/231.1 |
| 2006/0057466 | A1* | 3/2006 | Suhara | H01M 4/139 |
| | | | | 429/322 |
| 2009/0081550 | A1* | 3/2009 | Inoue | H01M 4/362 |
| | | | | 429/223 |
| 2013/0260248 | A1* | 10/2013 | Seki | H01M 4/505 |
| | | | | 429/221 |
| 2015/0010819 | A1 | 1/2015 | Lee et al. | |
| 2016/0164094 | A1 | 6/2016 | Takei et al. | |
| 2018/0215629 | A1* | 8/2018 | Honma | H01M 10/052 |
| 2019/0103605 | A1* | 4/2019 | Saitou | H01M 4/134 |
| 2019/0190018 | A1* | 6/2019 | Aoki | H01M 10/0525 |

FOREIGN PATENT DOCUMENTS

| | | | | |
|---|---|---|---|---|
| JP | 2005-116470 A | | 4/2005 | |
| JP | 2006-54159 A | | 2/2006 | |
| JP | 2013073833 A | * | 4/2013 | ......... H01L 21/0485 |
| JP | 2015-18803 A | | 1/2015 | |
| JP | 2016-110889 A | | 6/2016 | |
| JP | 2016-115658 A | | 6/2016 | |
| WO | 97/05062 A1 | | 2/1997 | |

OTHER PUBLICATIONS

Machine translation of JP-2013073833-A (no date).*
Translation of the written opinion (no date).*
International Search Report dated Mar. 14, 2017, issued in counterpart International Application No. PCT/JP2017/004307 (2 pages).

* cited by examiner

NONAQUEOUS ELECTROLYTE SECONDARY BATTERY

TECHNICAL FIELD

The present disclosure relates to a nonaqueous electrolyte secondary battery.

BACKGROUND ART

Lithium nickel complex oxide ($LiNiO_2$), which is a positive electrode material for a lithium-ion secondary battery, has advantages over lithium cobalt complex oxide ($LiCoO_2$), such as high capacity and stable availability of nickel due to having a lower cost than cobalt. Accordingly, lithium nickel complex oxide is expected as a next-generation positive electrode material. Lithium nickel complex oxide, however, generally has less durability compared with lithium cobalt complex oxide. Therefore, efforts have been made to improve the durability of lithium nickel complex oxide.

Patent Literature 1 describes an invention directed toward a positive electrode active material for a nonaqueous secondary battery that contains nickel and lithium as main components, that has a composition represented by a general formula of $Li_xNi_{1-p-q-r}Co_pAl_qA_rO_{2-y}$ (where value ranges of x, p, q, r, and y are $0.8 \leq x \leq 1.3$, $0 < p \leq 0.2$, $0 < q \leq 0.1$, $0 \leq r \leq 0.1$, $-0.3 < y < 0.1$ and A represents at least one element selected from a specific group), and that is composed of primary particles of a single crystal having an average particle size of 2 to 8 μm.

CITATION LIST

Patent Literature

PTL 1: Japanese Published Unexamined Patent Application No. 2006-54159

SUMMARY OF INVENTION

Technical Problem

Meanwhile, a lithium-ion secondary battery finds use in the field of electricity storage, and further durability performance is required for a lithium-ion secondary battery usable in such a field. Accordingly, there is a need for a nonaqueous electrolyte secondary battery having further enhanced durability relative to a nonaqueous electrolyte secondary battery using conventional nickel-excess lithium nickel complex oxide.

An object of the present disclosure is to provide a nonaqueous electrolyte secondary battery that contains, in a positive electrode, a positive electrode active material including nickel-excess lithium nickel complex oxide and that has further enhanced durability.

Solution to Problem

A nonaqueous electrolyte secondary battery according to the present disclosure includes: a positive electrode containing a positive electrode active material; a negative electrode; and a nonaqueous electrolyte, where the positive electrode active material includes lithium nickel complex oxide, and the lithium nickel complex oxide has a layered rock-salt structure and is represented by a composition formula of $Li_xNi_yM_zO_2$ (where M is at least one metal element selected from the group consisting of Co, Al, Mg, Ca, Cr, Zr, Mo, Si, Ti, and Fe, and x, y, and z satisfy $0.95 \leq x \leq 1.05$, $0.8 \leq y \leq 1$, $0 \leq z \leq 0.2$, and $y+z=1$). The secondary battery is characterized in that a half width n of a (104) diffraction peak in an X-ray diffraction pattern is 0.13° or less, and the content of the positive electrode active material with a particle size of 3.41 μm or less is 2 volume % or less based on a total amount of the positive electrode active material contained in the positive electrode.

Advantageous Effects of Invention

According to the present disclosure, a nonaqueous electrolyte secondary battery that contains, in a positive electrode, a positive electrode active material including nickel-excess lithium nickel complex oxide and that has further enhanced durability can be provided.

DESCRIPTION OF EMBODIMENTS

Figure 1:
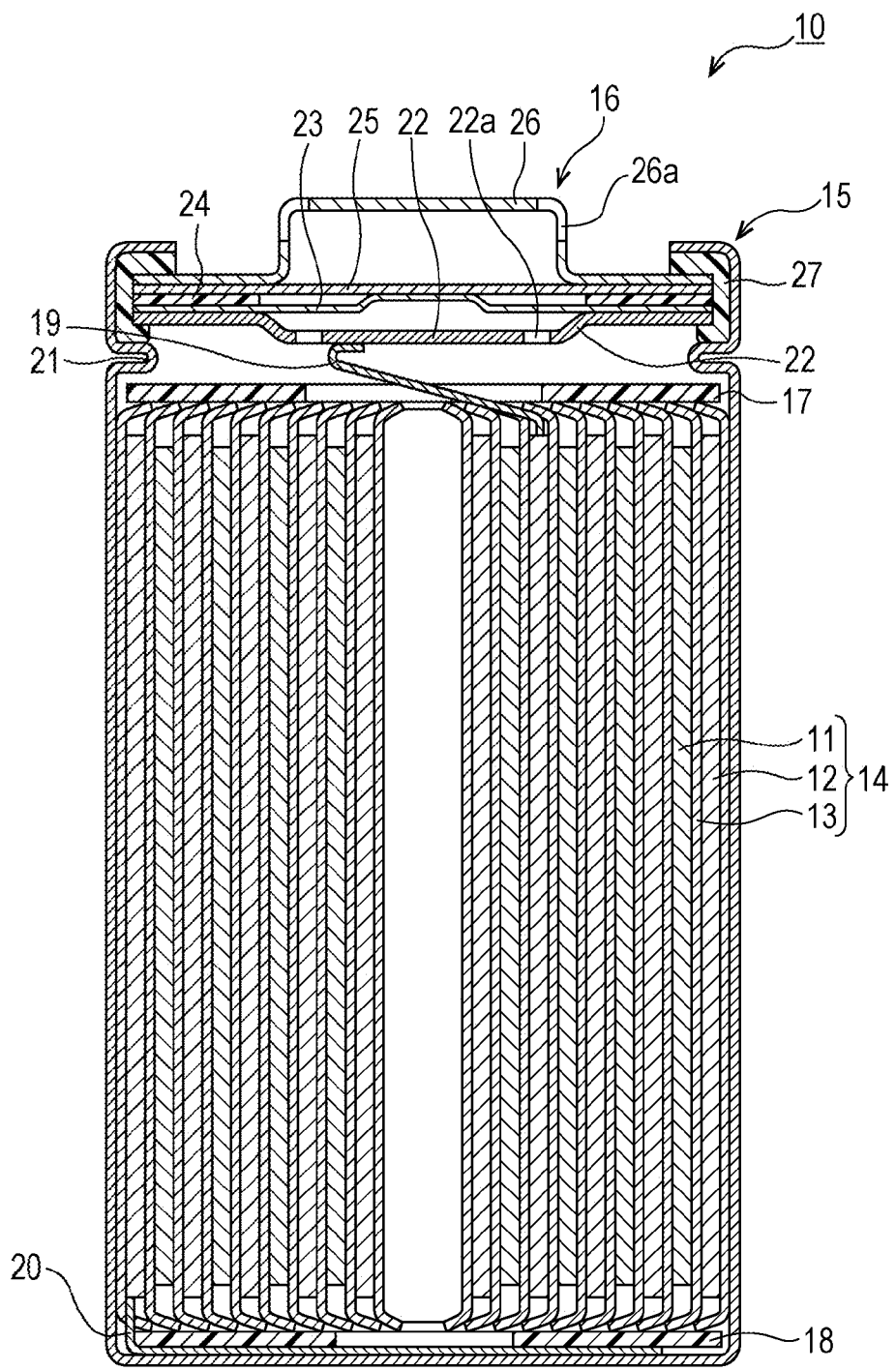
FIG. 1 is a sectional view of a nonaqueous electrolyte secondary battery as an exemplary embodiment.

Patent Literature 1 describes improved durability of a nonaqueous electrolyte secondary battery, which is achieved by using, as a positive electrode active material, primary particles that are formed of lithium nickel complex oxide having a specific composition and that have an average single crystal particle size of 2 to 8 μm. Patent Literature 1 also describes preparation of positive electrode active materials having different average particle sizes depending on manufacturing conditions or the like, as well as evaluation of durability thereof as a nonaqueous electrolyte secondary battery. Patent Literature 1, however, focuses only on the average particle size of a positive electrode active material, which is measured by using a scanning electron microscope (SEM), and thus effects, on electric characteristics, of the particle size dispersity (variations) of a positive electrode active material are not taken into account at all.

As a result of intensive research, the present inventors found that a nonaqueous electrolyte secondary battery, in which a positive electrode active material includes lithium nickel complex oxide that has a layered rock-salt structure, that is represented by a composition formula of $Li_xNi_yM_zO_2$ (where M is at least one metal element selected from the group consisting of Co, Al, Mg, Ca, Cr, Zr, Mo, Si, Ti, and Fe, and x, y, and z satisfy $0.95 \leq x \leq 1.05$, $0.8 \leq y \leq 1$, $0 \leq z \leq 0.2$, and y+z=1), and that has a half width n of a (104) diffraction peak in an X-ray diffraction pattern of 0.13° or less, where the content of the positive electrode active material with a particle size of 3.41 µm or less is 0.35 volume % or less based on a total amount of the positive electrode active material contained in the positive electrode, exhibits markedly excellent cycle durability, compared with a case in which a half width n of the (104) diffraction pattern is comparable to the above-mentioned value, but the content of the positive electrode active material with a particle size of 3.41 µm or less exceeds the above-mentioned range. According to such findings, further enhanced durability of a nonaqueous electrolyte secondary battery including, as a positive electrode active material, nickel-excess lithium nickel complex oxide can be achieved.

Hereinafter, an exemplary embodiment of the present disclosure will be described in detail.

Hereinafter, an exemplary embodiment will be described in detail.

Since Figures, which are referred to in the description of the embodiment, is schematically illustrated, specific dimensional ratios and the like should be determined by taking account of the description below. A cylindrical battery in which an electrode assembly 14 of a rolled structure is held in a battery case will be illustrated hereinafter. Such an electrode assembly structure, however, is not limited to a rolled structure and may be a stacked structure in which a plurality of positive electrodes and a plurality of negative electrodes are alternately stacked with separators in between. In addition, the shape of the battery case is not limited to a cylindrical shape and may be, for example, a metal case of a prismatic shape (prismatic battery), a coin shape (coin battery), or the like, or the battery case may be a resin case composed of resin films (laminated battery).

FIG. 1 is a sectional view of a nonaqueous electrolyte secondary battery 10 as an exemplary embodiment. As illustrated in FIG. 1, the nonaqueous electrolyte secondary battery 10 includes an electrode assembly 14, a nonaqueous electrolyte (not shown), and a battery case that holds the electrode assembly 14 and the nonaqueous electrolyte. The electrode assembly 14 has a rolled structure in which a positive electrode 11 and a negative electrode 12 are rolled with a separator 13 in between. The battery case is composed of a cylindrical case body 15 having a bottom and a seal 16 that covers an opening of the case body.

The nonaqueous electrolyte secondary battery 10 includes insulating plates 17 and 18 arranged above and below the electrode assembly 14, respectively. In the example illustrated in FIG. 1, a positive electrode lead 19 attached to the positive electrode 11 extends to the seal 16 side via a through hole in the insulating plate 17, whereas a negative electrode lead 20 attached to the negative electrode 12 extends to the bottom side of the case body 15 via the outside of the insulating plate 18. The positive electrode lead 19 is connected to a lower surface of a filter 22, which is a bottom plate of the seal 16, by welding or the like, and thus a cap 26, which is a top plate of the seal 16 electrically connected to the filter 22, becomes a positive electrode terminal. Meanwhile, the negative electrode lead 20 is connected to the bottom inner surface of the case body 15 by welding or the like, and thus the case body 15 becomes a negative electrode terminal.

The case body 15 is a cylindrical metal container having a bottom, for example. A gasket 27 is provided between the case body 15 and the seal 16, thereby ensuring sealing of the inside of the battery case. The case body 15 has an overhang 21 that is formed, for example, by pressing the side surface portion from the outside and that supports the seal 16. The overhang 21 is preferably formed annularly in the circumferential direction of the case body 15 and supports the seal 16 by its upper surface.

The seal 16 includes the filter 22 and a valve arranged above the filter 22. The valve closes the opening 22a of the filter 22 and breaks when internal pressure of the battery rises due to heat generated by an internal short circuit, for example. In the example illustrated in FIG. 1, a lower valve 23 and an upper valve 25 are provided as valves. Further, an insulator 24 arranged between the lower valve 23 and the upper valve 25, and the cap 26 are provided. Each component of the seal 16 has, for example, a disk shape or a ring shape, and such components excluding the insulator 24 are electrically connected to each other. For example, when internal pressure of the battery rises significantly, the lower valve breaks at its thin portion, and consequently the upper valve 25 expands to the cap 26 side and moves apart from the lower valve 23, thereby electrical connections being shut down between the lower valve 23 and the upper valve 25. When internal pressure rises further, the upper valve 25 breaks to release gas from an opening 26a of the cap 26.

[Positive Electrode]

The positive electrode is composed of a positive electrode current collector, such as a metal foil, and a positive electrode active material layer famed on the positive electrode current collector. For example, a metal foil of aluminum or the like, which is stable in the potential range of the positive electrode, or a film having such metal as a surface layer, for example, may be used for the positive electrode current collector. In addition to the positive electrode active material, the positive electrode active material layer preferably contains a conductive agent and a binder. The conductive agent is used to enhance electric conductivity of the positive electrode active material layer.

Examples of the conductive agent include carbon materials, such as carbon black, acetylene black, Ketjen black, and graphite. These may be used alone or in a combination of two or more. The content of the conductive agent is preferably 0.1 to 30 mass %, more preferably 0.1 to 20 mass %, and particularly preferably 0.1 to 10 mass % based on the total mass of the positive electrode active material layer.

The binder is used to maintain a good contact state between the positive electrode active material and the conductive agent and to enhance binding properties of the positive electrode active material and the like to the surface of the positive electrode current collector. Examples of the binder include polytetrafluoroethylene (PTFE), polyvinylidene fluoride, polyvinyl acetate, a polymethacrylate, a polyacrylate, polyacrylonitrile, polyvinyl alcohol, and two or more mixtures thereof. The binder may be used together with a thickening agent, such as carboxymethyl cellulose (CMC) or polyethylene oxide (PEO). These may be used alone or in a combination of two or more. The content of the binder is preferably 0.1 to 30 mass %, more preferably 0.1 to 20 mass %, and particularly preferably 0.1 to 10 mass % based on the total mass of the positive electrode active material layer.

A positive electrode of a secondary battery according to the embodiment can be prepared, for example, by applying a slurry containing a positive electrode active material, a conductive agent, a binder, and the like to one surface or both surfaces of a positive electrode current collector, drying the resulting coating, and then compressing (rolling) the dried coating to form a positive electrode active material layer.

[Positive Electrode Active Material]

Hereinafter, the positive electrode active material will be described in detail.

The positive electrode active material usable for a nonaqueous electrolyte secondary battery as an exemplary embodiment of the present disclosure (also simply referred to as a "positive electrode active material") contains lithium nickel complex oxide as a main component. The phrase "contains as a main component" herein means that the content of lithium nickel complex oxide is, for example, 90 mass % or more and preferably 99 mass % or more based on the total amount of the positive electrode active material.

Lithium nickel complex oxide has a layered rock-salt structure and contains at least lithium (Li) and nickel (Ni), where nickel is contained at 80 mol % or more based on the total amount of metal excluding lithium. Hereinafter, lithium nickel complex oxide included in the positive electrode active material according to the present disclosure is also simply referred to as a "layered oxide".

The layered oxide can be represented by, for example, a composition formula of $Li_xNi_yM_zO_2$, where M is at least one metal element selected from the group consisting of cobalt (Co), aluminum (Al), magnesium (Mg), calcium (Ca), chromium (Cr), zirconium (Zr), molybdenum (Mo), silicon (Si), titanium (Ti), and iron (Fe), and x, y, and z satisfy $0.90 \leq x \leq 1.05$, $0.8 \leq y \leq 1$, $0 \leq z \leq 0.2$, and $y+z=1$.

The content of lithium in the layered oxide is preferably 95 mol % or more and 1.05 mol % or less based on the total amount of metal excluding lithium. In other words, $0.90 \leq x \leq 1.05$ is preferably satisfied in the above composition formula. By incorporating lithium in this range, the charge/discharge capacity of a nonaqueous electrolyte secondary battery can be enhanced.

As described above, the layered oxide contains 80 mol % or more of nickel based on the total amount of metal excluding lithium. In other words, $0.8 \leq y \leq 1$ is satisfied in the above composition formula. By incorporating this range of nickel into the layered oxide, basic durability of a nonaqueous electrolyte secondary battery is enhanced. The layered oxide preferably contains 85 mol % or more and 95 mol % or less of nickel, based on the total amount of metal excluding lithium.

The layered oxide preferably contains cobalt to enhance the durability of a nonaqueous electrolyte secondary battery. For example, cobalt is preferably contained in an amount of 3 mol % or more and 15 mol % or less based on the total amount of metal excluding lithium (Ni and M in the above composition formula).

The layered oxide preferably contains aluminum. For example, aluminum is preferably contained in an amount of 1 mol % or more and 5 mol % or less based on the total amount of metal excluding lithium (Ni and M in the above composition formula). By incorporating aluminum into the layered oxide, durability of a nonaqueous electrolyte secondary battery can be enhanced. Further, by incorporating aluminum in an amount of 5 mol % or less, the charge/discharge capacity of a nonaqueous electrolyte secondary battery can be enhanced.

In view of the above, a metal element M of the above-mentioned composition formula preferably includes cobalt and aluminum. In addition to Li, Ni, and the metal element M, the layered oxide may contain at least one metal element selected from transition metal elements, alkaline earth metal elements, and group 12 to group 14 elements, for example, unless the object of the present disclosure is lost.

The layered oxide is preferably free of manganese. When the layered oxide contains manganese, durability of a secondary battery is decreased in some cases. Similarly, raw materials for the layered oxide are preferably free of chlorides, and thus the layered oxide is preferably free of chlorine since durability of a secondary battery is decreased in some cases. The layered oxide being "free of" a certain element herein means that such an element is contained in an amount less than a detection limit in measurement of the layered oxide composition by a measurement method described hereinafter.

The layered oxide represented by the above composition formula is not necessarily limited to a layered oxide in which a molar ratio of the total amount of nickel and the metal element M to oxygen atom is exactly 1:2. For example, even a layered oxide with the above molar ratio of 1:1.9 to 1:2.1 can be regarded as being included in the layered oxide represented by the above composition formula.

The composition of a layered oxide used as a positive electrode active material in the embodiment can be determined by using an ICP atomic emission spectrometer (trade name "iCAP6300" from Thermo Fisher Scientific Inc., for example).

A layered rock-salt structure of the layered oxide is a crystal structure in which lithium layers and layers of metal excluding lithium are alternately stacked with oxygen atom layers being interposed therebetween. Examples of the layered rock-salt structure include crystal structures belonging to space group R-3m. Examples of compounds having such a layered rock-salt structure include lithium nickel oxide ($LiNiO_2$) and nickel cobalt oxide ($LiCoO_2$). The layered oxide represented by the above composition formula is also considered to have a layered crystal structure.

Whether the layered oxide has a layered rock-salt structure can be determined by analysis using a commonly known method based on powder X-ray diffraction. The presence of a layered rock-salt structure is confirmed by detecting (101) and (104) diffraction peaks of the layered rock-salt structure that appear at diffraction angles (2θ) near 36.6° and near 44.4° in the X-ray diffraction pattern of the layered oxide.

The layered oxide according to the embodiment is characterized in that a half width (full width at half maximum) n of the (104) diffraction peak in the X-ray diffraction pattern is 0.13° or less. Such a layered oxide is believed to have single crystal particles of a large particle size and low lattice distortion. The team "single crystal particles" herein refers to particles formed from a single crystal structure.

A layered oxide conventionally used as a positive electrode material is composed of secondary particles formed from aggregated single crystal particles (primary particles) of a small particle size. When a secondary battery containing such secondary particles composed of aggregated single crystal primary particles as a positive electrode active material undergoes charge/discharge cycles several hundred to several thousand times, it is believed that the shape of each secondary particle cannot be maintained (particle cracking) due to loosened aggregated primary particles, and consequently durability of a secondary battery is decreased in some cases.

In contrast, the layered oxide of the embodiment in which a half width n is 0.13° or less has single crystal particles of a sufficiently large particle size that enables use as a positive electrode active material without further processing. Accordingly, there is no risk of decreased durability due to particle cracking, which is observed in secondary particles famed from aggregated primary particles. Therefore, by using a layered oxide with a half width n of 0.13° or less as a positive electrode active material, a secondary battery having further enhanced durability can be manufactured.

Figure 2:
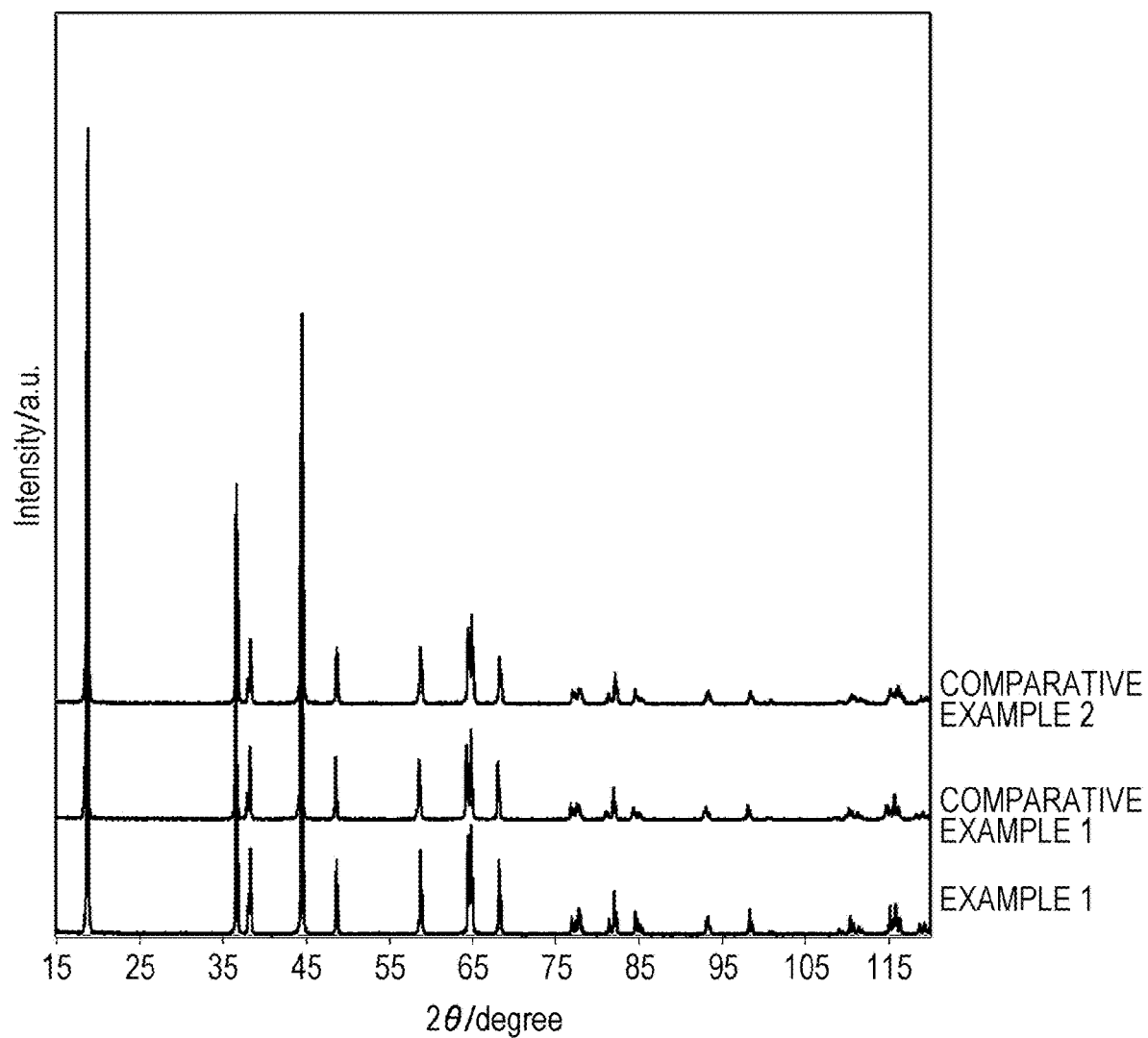
FIG. 2 illustrates powder X-ray diffraction patterns of lithium nickel complex oxide prepared in Example and Comparative Examples.

FIG. 2 shows X-ray diffraction patterns obtained through analysis based on powder X-ray diffraction of lithium nickel complex oxide prepared by altering manufacturing conditions. In each diffraction pattern shown in FIG. 2, the (104) diffraction peak of each layered oxide appears at a diffraction angle (2θ) of near 44.4°.

The layered oxide preferably has a half width of the (101) diffraction peak of 0.13° or less in the X-ray diffraction pattern, and also preferably has a half width of the (211) diffraction peak of 0.25° or less in the X-ray diffraction pattern. Similarly to the (104) diffraction peak, a layered oxide in which half widths of the (101) and the (211) diffraction peaks fall within the above ranges has single crystal particles of a large particle size and low lattice distortion. In each diffraction pattern shown in FIG. 2, the (101) and the (211) diffraction peaks of a layered oxide appear at diffraction angles (2θ) of near 36.6° and near 44.4°, respectively.

The layered oxide according to the embodiment can be synthesized in accordance with the following method, for example. First, a lithium compound, such as lithium hydroxide, and an oxide containing nickel and the metal element M of the above-mentioned composition formula are mixed at a mixing ratio based on an intended layered oxide. In this step, a potassium compound is further added to the resulting mixture. The mixture of the lithium compound, the compound containing nickel and the metal element M, and the potassium compound is calcined in air or under a stream of oxygen. Subsequently, the resulting calcined product is washed with water to remove the potassium compound attached to the calcined product surface.

A layered oxide synthesized in accordance with the above method is to have the above-described specific X-ray diffraction pattern, a large single crystal particle size, and specific particle size distribution described hereinafter. Although the detailed theory is unclear, it is believed that the growth of single crystal particles during calcination progresses uniformly over the entire mixture phase in response to addition of a potassium compound to the mixture.

Examples of the potassium compound used in the above preparation method include potassium hydroxide (KOH), a salt thereof, and potassium acetate. The amount of the potassium compound used is, for example, 0.1 mass % or more and 100 mass % or less in accordance with a layered oxide to be synthesized. A calcination temperature in the above preparation method is about 600° C. to 1,100° C., for example, and a calcination time is about 1 to 50 hours at a calcination temperature of 600° C. to 1,100° C.

A secondary battery according to the embodiment is characterized in that the content of a positive electrode active material with a particle size of 3.41 µm or less is 2 volume % or less based on the total amount of the positive electrode active material contained in a positive electrode. Hereinafter, the content of a positive electrode active material having a specific particle size range in a positive electrode based on the total amount of the positive electrode active material is also referred to as a "content ratio" of such a positive electrode active material. In a secondary battery according to the embodiment, the content ratio of a positive electrode active material with a particle size of 3.41 µm or less is preferably 1 volume % or less and more preferably 0.35 volume % or less.

As in the foregoing, a secondary battery according to the embodiment exhibits further enhanced durability (cycle characteristics) by employing a positive electrode manufactured by using a positive electrode active material with a low content ratio of a positive electrode active material having a small particle size. It is believed that due to a low content ratio of a positive electrode active material having a small particle size, a surface area of the entire positive electrode active material is decreased and thus side reactions between an electrolyte solution and the positive electrode active material are suppressed, thereby enhancing reaction homogeneity in the main reaction.

From a viewpoint similar to the above, a secondary battery according to the embodiment preferably has a content ratio of a positive electrode active material with a particle size of 2.27 µm or less of 0.5 volume % or less. More preferably, a positive electrode active material with a particle size of 2.27 µm or less is not contained. From a viewpoint similar to the above, a secondary battery according to the embodiment has a content ratio of a positive electrode active material with a particle size of 1.5 µm or less of 0.1 volume % or less. More preferably, a positive electrode active material with a particle size of 1.5 µm or less is not contained. The expression "a positive electrode active material with a specific particle size range is not contained" herein means that a content ratio of the positive electrode active material included in a corresponding particle size range is equal to or lower than a detection limit in measurement of the particle size distribution for the positive electrode active material by the method described hereinafter.

Figure 3A:
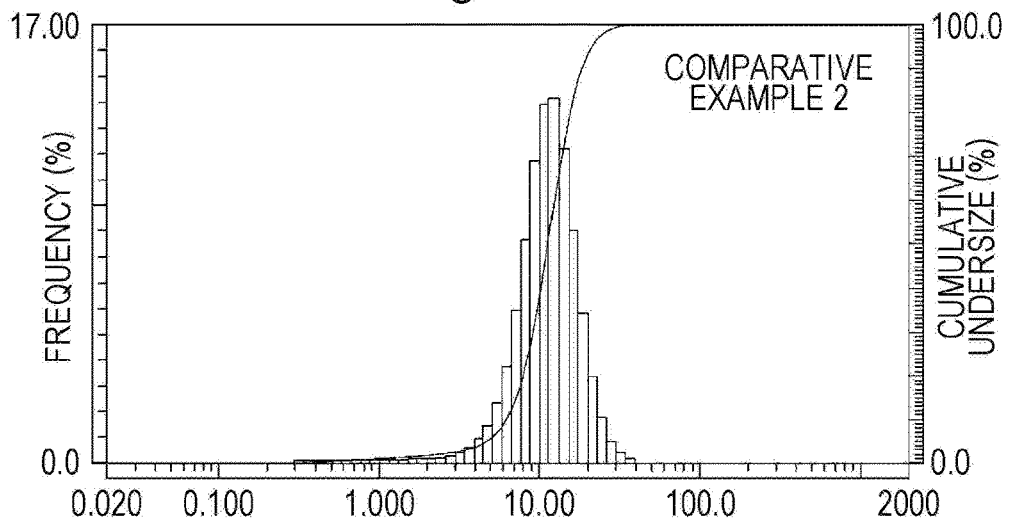
FIGS. 3A to 3C illustrate the particle size distribution of lithium nickel complex oxide prepared in Example and Comparative Examples.
Figure 3B:
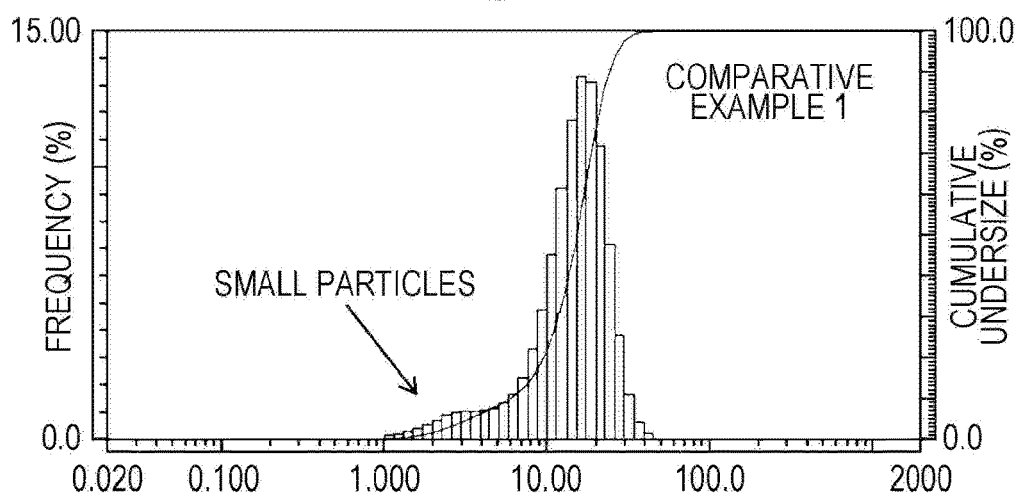
Figure 3C:
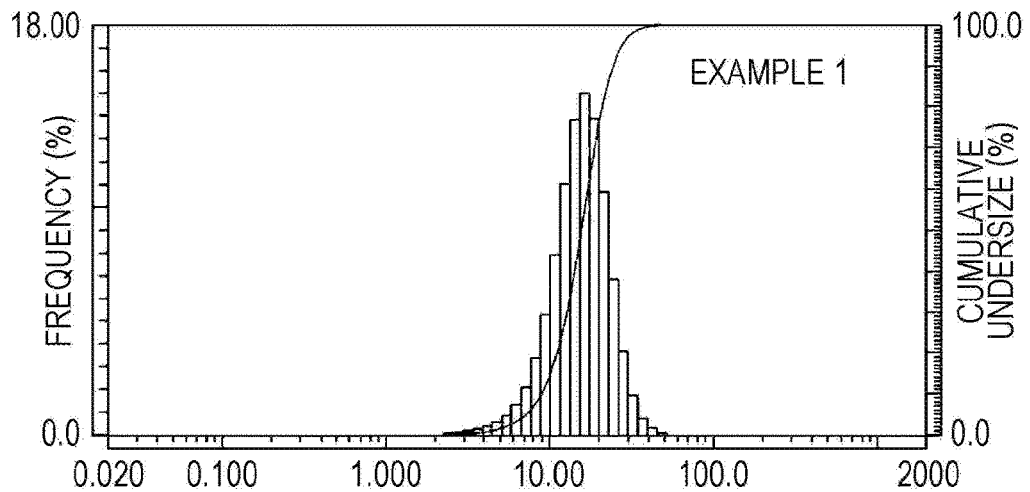

FIGS. 3A to 3C show specific examples of the distribution of the content ratio of a positive electrode active material for each particle size (particle size distribution). In FIGS. 3A to 3C, the horizontal axis represents the particle size of a positive electrode active material, and the vertical axis represents the content ratio (volume %) of a positive electrode active material in the corresponding particle size range. The particle size distribution of a positive electrode active material contained in a positive electrode is measured by using a laser diffraction/scattering-type particle size distribution analyzer (trade name "LA-920" from HORIBA, Ltd., for example). The particle size of a positive electrode active material measured by the above measurement method is determined on the basis of diffracted/scattered light patterns upon laser irradiation of the positive electrode active material. A dispersion medium usable in the measurement of particle size distribution is water, for example.

In the manufacture of a secondary battery according to the embodiment, a layered oxide, which is obtained by removing, through a commonly known method, such as the use of a sieve having an appropriate mesh diameter, a layered oxide with a small particle size from a layered oxide prepared on the basis of the above-described method or the like, may be used as a positive electrode active material. The particle size distribution of a positive electrode active material usable for the manufacture of a positive electrode can thus be adjusted to a desired range.

The hardness of a positive electrode active material can be evaluated in tams of compressive fracture strength. Compressive fracture strength (St) is calculated in accordance with an expression of $St=2.8P/(\pi d^2)$, where P represents a load on particles and d represents a particle size, which is described in the "Journal of the Mining and Metallurgical Institute of Japan" (vol. 81, issue No. 932, pages 1,024 to 1030, December, 1965). Compressive fracture strength is highly dependent on particle size since compressive fracture strength is divided by the square of particle size and increases as particle size decreases. Accordingly, compressive fracture strength is preferably specified at a predetermined particle size.

The positive electrode active material preferably has a compressive fracture strength of 190 MPa or higher at a specified particle size of about 8 μm. The phrase "a particle size of about 8 μm" herein denotes a particle size in the range of 8 μm±≤5%. It is believed that when a positive electrode active material having a compressive fracture strength in the above range is used, particle cracking during the use of a secondary battery is suppressed, thereby further enhancing durability of the secondary battery. The upper limit of a compressive fracture strength is not particularly limited but is preferably 1,000 MPa or lower from a viewpoint of preventing damage on metal foil, which is a positive electrode current collector, in a compression (rolling) step during the manufacture of a positive electrode. Compressive fracture strength of a positive electrode active material can be measured by using, for example, a micro compression tester (model name "MCT-W201" from Shimadzu Corporation).

When a positive electrode active material contained in a positive electrode of a manufactured secondary battery is measured for an X-ray diffraction pattern, complex oxide composition, particle size distribution, compressive fracture strength, and the like, each measurement can be performed for a positive electrode active material layer obtained after peeling the positive electrode active material layer from a positive electrode current collector by using NMP (N-methyl-2-pyrrolidone), for example, as a solvent. The composition of a complex oxide can be measured by dissolving the positive electrode active material layer with an acid or the like. As for particle size distribution, since the particle size distribution of a conductive agent can be measured from precipitates after dissolving the positive electrode active material layer with an acid or the like, the particle size distribution solely of a positive electrode active material can be determined by comparing the particle size distribution of the positive electrode active material layer and the particle size distribution of the conductive agent.

In a positive electrode active material measured in an active material sectional image obtained by observing a section of the positive electrode active material layer under a scanning ion microscope (SIM), the number of single crystal particles of a layered oxide contained in the positive electrode active material having a size that encloses a circle of radius 1.7 μm (diameter 3.41 μm) is preferably less than 10 in a secondary battery according to the embodiment. The number of single crystal particles is measured by the method described hereinafter. It is believed that a secondary battery having the number of single crystal particles in the above range exhibits enhanced reaction homogeneity and higher durability due to the positive electrode active material composed of single crystal particles with a uniform particle size.

The section of the positive electrode active material layer can be prepared for SIM observation, for example, by cutting out a 7 mm-square from a positive electrode plate, and performing finish sectional processing by a cross section polisher (CP) method.

Figure 5:
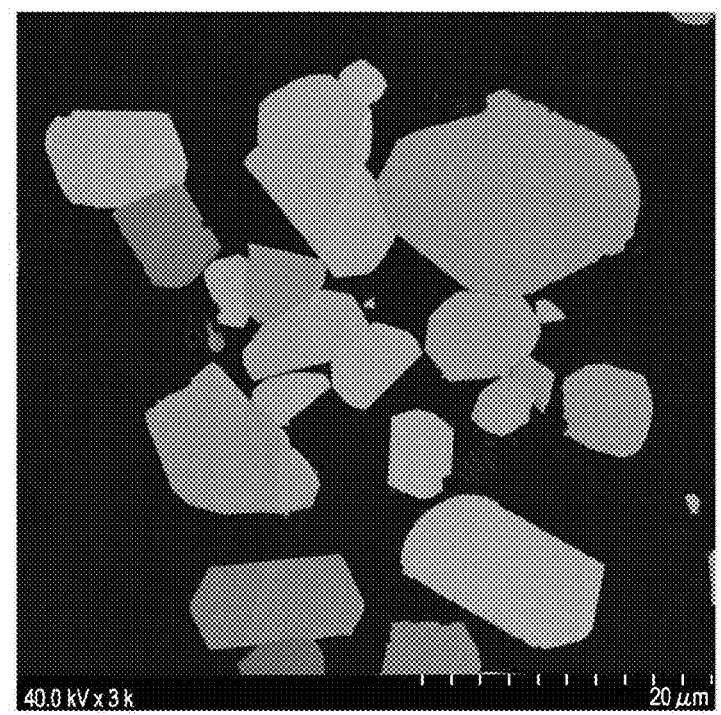
FIG. 5 shows a sectional image, by a SIM, of a positive electrode active material layer of a positive electrode manufactured in Example 1.

The prepared section is observed by using a scanning ion microscope (SIM) at a magnification of 1,000× to 10,000×, and then an observed image is analyzed using analysis software (trade name "Image-Pro PLUS" from Media Cybernetics, Inc., for example). Sectional observation using a SIM is performed by irradiating a specimen with a Ga ion beam and detecting secondary electrons emitted from the specimen. Through such steps, an image of a section (hereinafter, referred to as "sectional image") of a positive electrode active material layer with clear contrast (channeling contrast) based on differences in crystal orientation of a layered oxide is obtained. Further, in such a sectional image, a conductive agent and a binder are clearly distinguished from single crystal particles of a layered oxide. FIG. 5 shows an exemplary image observed by a SIM of a section of a positive electrode active material layer, which is obtained by the method described above.

By using the above-mentioned sectional image, the number of single crystal particles of a layered oxide in a section of a positive electrode active material layer can be measured. In the embodiment, the phrase "the positive electrode active material larger than a circle of 1.7 μm-radius" refers to, among positive electrode active materials randomly selected in the above-mentioned sectional image, a positive electrode active material that completely encloses a hypothetical "circle of 1.7 μm-radius" centered on a point bisecting the longest particle size, in other words, a positive electrode active material in which such a hypothetical circle does not extend outside in the above-mentioned sectional image. In addition, the phrase "the number of single crystal particles of a layered oxide contained in the positive electrode active material larger than a circle of 1.7 μm-radius" means an average measured value obtained by measuring the number of single crystal particles of the layered oxide contained inside "the positive electrode active material larger than a circle of 1.7 μm-radius". In the embodiment, the number of single crystal particles (average value) is calculated by measuring the number of such single crystal particles for arbitrary 50 positive electrode active materials, excluding 10 numerical values each from the largest side and from the smallest side, averaging the obtained 30 measured values, and rounding off the average value to the closest whole number.

[Negative Electrode]

A negative electrode includes, for example, a negative electrode current collector, such as a metal foil, and a negative electrode active material layer formed on the surface of the negative electrode current collector. A metal foil of aluminum, copper, or the like, which is stable in the potential range of the negative electrode, and a film having such metal as a surface layer, for example, may be used for the negative electrode current collector. The negative electrode active material layer preferably contains a binder, in addition to a negative electrode active material that can adsorb/desorb lithium ions. Further, a conductive agent may be contained as necessary.

Examples of the negative electrode active material include natural graphite, artificial graphite, lithium, silicon, carbon, tin, germanium, aluminum, lead, indium, gallium, a lithium alloy, lithiated carbon or silicon, alloys thereof, and mixtures thereof. Preferably, carbon materials, such as natural graphite, artificial graphite, carbon, and lithiated carbon, are preferably contained. Although PTFE or the like can also be used similarly to the case of a positive electrode, styrene-butadiene copolymer (SBR) or modified SBR, for example, is preferably used as a binder. The binder may be used together with a thickening agent, such as CMC.

[Nonaqueous Electrolyte]

A nonaqueous electrolyte contains a nonaqueous solvent and an electrolyte salt dissolved in the nonaqueous solvent. The nonaqueous electrolyte is not limited to a liquid electrolyte (nonaqueous electrolyte solution) and may be a solid electrolyte using a gel polymer, for example. Examples of the nonaqueous solvent include esters; ethers; nitriles, such as acetonitrile; amides, such as dimethylformamide; and mixed solvents of two or more thereof.

Examples of the esters include cyclic carbonate esters, such as ethylene carbonate, propylene carbonate, and butylene carbonate; linear carbonate esters, such as dimethyl carbonate, methyl ethyl carbonate, diethyl carbonate, methyl propyl carbonate, ethyl propyl carbonate, and methyl isopropyl carbonate; and carboxylic acid esters, such as methyl acetate, ethyl acetate, propyl acetate, methyl propionate, ethyl propionate, and γ-butyrolactone.

Examples of the ethers include cyclic ethers, such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol, and a crown ether; and linear ethers, such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

The nonaqueous solvents preferably include halogenated solvents, in which hydrogen of the above-mentioned various solvents is replaced with halogen atoms, such as fluorine. In particular, a fluorinated cyclic carbonate ester and a fluorinated linear carbonate ester are preferred, and more preferably both of them are mixed and used. Such a solvent results in the formation of a good protective coating on a positive electrode in addition to a negative electrode, thereby enhancing cycle characteristics. Preferred examples of the fluorinated cyclic carbonate ester include 4-fluoroethylene carbonate, 4,5-difluoroethylene carbonate, 4,4-difluoroethylene carbonate, 4,4,5-trifluoroethylene carbonate, and 4,4,5,5-tetrafluoroethylene carbonate. Preferred examples of the fluorinated linear ester include ethyl 2,2,2-trifluoroacetate, methyl 3,3,3-trifluoropropionate, and methyl pentafluoropropionate.

The electrolyte salt is preferably a lithium salt. Examples of the lithium salt include $LiPF_6$, $LiBF_4$, $LiAsF_6$, $LiClO_4$, $LiCF_3SO_3$, $LiN(FSO_2)_2$, $LiN(C_lF_{2l+1}SO_2)(C_mF_{2m+1}SO_2)$ (l and m each represent an integer of 1 or more), $LiC(C_pF_{2p+1}SO_2)(C_qF_{2q+1}SO_2)(C_rF_{2r+1}SO_2)$ (p, q, and r each represent an integer of 1 or more), $Li[B(C_2O_4)_2]$ (lithium bis(oxalato)borate (LiBOB)), $Li[B(C_2O_4)F_2]$, $Li[P(C_2O_4)F_4]$, $Li[P(C_2O_4)_2F_2]$, $LiPO_2F_2$. Such a lithium salt may be used alone or in a combination of two or more.

[Separator]

An ion-permeable insulating porous sheet is used as a separator. Specific examples of the porous sheet include a microporous membrane, a woven fabric, and a nonwoven fabric. As materials for the separator, olefin resins, such as polyethylene and polypropylene, and cellulose, for example, are preferred. The separator may be a layered structure including a cellulose fiber layer and a thermoplastic resin fiber layer famed of an olefin resin, for example.

EXAMPLES

Hereinafter, the present disclosure will be further specifically described with Examples. The present disclosure, however, is not limited to the following Examples.

Example 1

[Preparation of Positive Electrode Active Material (Layered Oxide)]

NiCoAl complex oxide was prepared by obtaining nickel cobalt aluminum complex hydroxide represented by a composition formula of $Ni_{0.88}Co_{0.09}Al_{0.03}(OH)_2$ through coprecipitation, and then heat-treating the complex hydroxide at 500° C. Subsequently, LiOH and NiCoAl complex oxide were mixed in respective amounts such that a molar ratio of Li to the total metal (Ni, Co, Al) excluding Li became 1.03:1. Further, KOH was added to the resulting mixture in an amount of 10 mass % based on the expected composition of the layered oxide ($Li_{1.03}Ni_{0.88}Co_{0.09}Al_{0.03}O_2$). After that, the mixture was calcined under a stream of oxygen at 750° C. for 40 hours. A layered oxide A1 was prepared by washing the calcined product with water to remove KOH attached to the calcined product surface.

The composition of the layered oxide A1 was determined by using an ICP atomic emission spectrometer (trade name "iCAP6300" from Thermo Fisher Scientific Inc.). As the result, the layered oxide A1 was a complex oxide represented by a composition formula of $Li_{1.03}Ni_{0.88}Co_{0.09}Al_{0.03}O_2$.

The crystal structure of the layered oxide A1 was analyzed through powder X-ray diffraction using a powder X-ray diffractometer (trade name "RINT2200" from Rigaku Corporation, Cu-Kα). As the result of the analysis, the crystal structure of the layered oxide A1 was determined to be a layered rock-salt structure belonging to space group R-3m, and half widths n (2θ) of diffraction peaks corresponding to the (101) plane, the (104) plane, and the (211) plane were 0.112°, 0.120°, and 0.181°, respectively.

The particle size distribution of the layered oxide A1 was measured. The measurement of the particle size distribution was performed under measurement conditions described hereinafter, and an average value of three measurements was regarded as a measurement result.

[Measurement Conditions]

Testing apparatus: laser diffraction/scattering-type particle size distribution analyzer (trade name "LA-920" from HORIBA, Ltd.)

Dispersion medium: reverse osmosis (RO)-purified water

Primary dispersion: 1 minute

Apparatus circulation bath settings: built-in ultrasonic irradiation for 1 minute, circulation speed of 5

Relative refractive index: 1.50-0.40i

Figure 4:
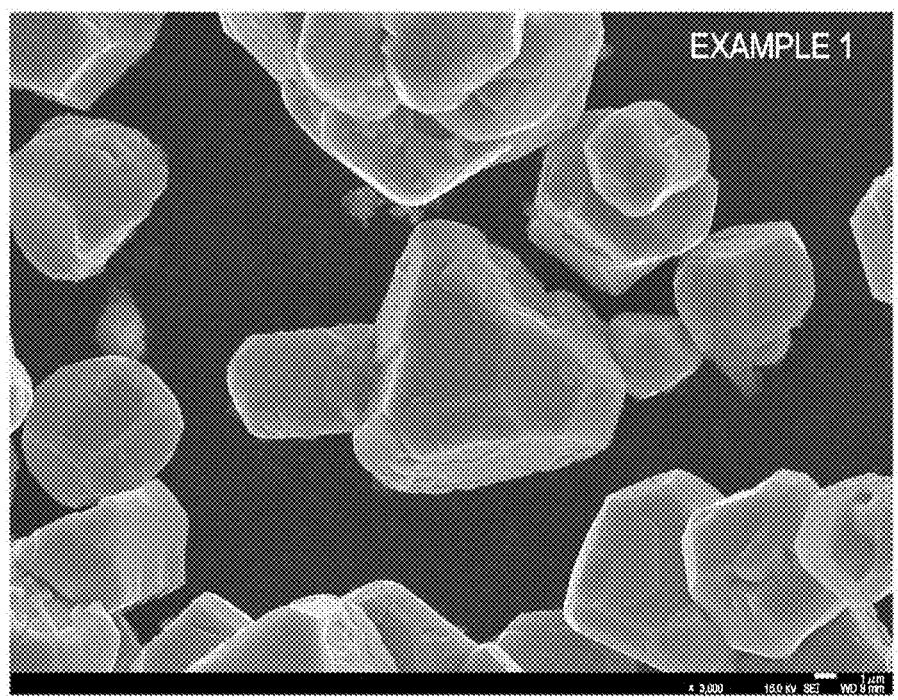
FIG. 4 shows a SEM image of lithium nickel complex oxide prepared in Example 1.

As the result of the particle size distribution measurement, the layered oxide A1 had the content of the positive electrode active material with a particle size of 3.41 μm or less of 0.26 volume %, and both contents of the positive electrode active material with a particle size of 2.27 μm or less and the positive electrode active material with a particle size of 1.5 μm or less of 0 volume % (equal to or less than the detection limit). FIG. 4 shows an image obtained by observing the layered oxide A1 particles under a SEM at a magnification of 3,000×.

The compressive fracture strength (St) of the layered oxide A1 was measured. The measurement of the compressive fracture strength was performed for five particles of the layered oxide A1 with a particle size of about 8 μm (8 μm±5%) under measurement conditions described hereinafter. An average of the obtained measurement values was regarded as the compressive fracture strength of the layered oxide A1. The compressive fracture strength of the layered oxide A1 was 210 MPa.

[Measurement Conditions]

Test temperature: ambient temperature (25° C.)

Testing apparatus: micro compression tester, model name "MCT-W201" from Shimadzu Corporation Upper indenter: 50 μm-diameter plane Measurement mode: compression test Test load: 90 mN Loading rate: 2.6478 mN/s

[Preparation of Positive Electrode]

The thus-prepared layered oxide A1 as a positive electrode active material, acetylene black as a conductive agent, and polyvinylidene fluoride as a binder were mixed in amounts of 91 parts by mass, 7 parts by mass, and 2 parts by mass, respectively. The resulting mixture was kneaded by using a kneader (T.K. HIVIS MIX from Primix Corporation) to yield a positive electrode mixture slurry. An electrode (positive electrode A1) was manufactured by applying the positive electrode mixture slurry on a 15 µm-thick aluminum foil and drying the coating so as to form a positive electrode mixture layer on the aluminum foil.

FIG. 5 shows a sectional image, which was obtained through observation under a scanning ion microscope (SIM) in accordance with the above-described method, of the positive electrode active material layer of the positive electrode A1. The number of single crystal particles of the layered oxide A1 contained in a 1.7 µm radius-circle centered on the positive electrode active material was measured using the sectional image of the obtained positive electrode active material layer. As the result, the number of single crystal particles (average value) was 3.

[Preparation of Nonaqueous Electrolyte]

Ethylene carbonate (EC), methyl ethyl carbonate (MEC), and dimethyl carbonate (DMC) were mixed in a volume ratio of 3:3:4. A nonaqueous electrolyte was prepared by dissolving lithium hexafluorophosphate ($LiPF_6$) in the mixed solvent so as to show the concentration of 1.2 mol/L.

[Preparation of Test Cell]

An electrode assembly was manufactured by stacking the above-described positive electrode A1 and a negative electrode formed of a lithium metal foil so as to face each other with a separator in between. Subsequently, a nonaqueous electrolyte secondary battery (test cell A1) was manufactured by placing the electrode assembly and the nonaqueous electrolyte solution inside a case.

Comparative Example 1

In the preparation of a positive electrode active material, a layered oxide B1 was prepared in a similar manner to Example 1 except for adding NaOH, in place of KOH, in an amount of 10 mass % based on the expected composition of the layered oxide ($Li_{1.03}Ni_{0.88}Co_{0.09}Al_{0.03}O_2$) to the mixture of LiOH and NiCoAl complex oxide. A positive electrode B1 and a nonaqueous electrolyte secondary battery (test cell B1) were each manufactured by using the layered oxide B1.

Similar tests to the tests in Example 1 were performed for the layered oxide B1 and the positive electrode B1. The layered oxide B1 was determined to be a complex oxide represented by a composition formula of $Li_{1.03}Ni_{0.88}Co_{0.09}Al_{0.03}O_2$. As the result of powder X-ray diffraction analysis, the crystal structure of the layered oxide B1 was determined to be a layered rock-salt structure belonging to space group R-3m, and half widths n (2θ) of diffraction peaks corresponding to the (101) plane, the (104) plane, and the (211) plane were 0.124°, 0.129°, and 0.260°, respectively.

Figure 6:
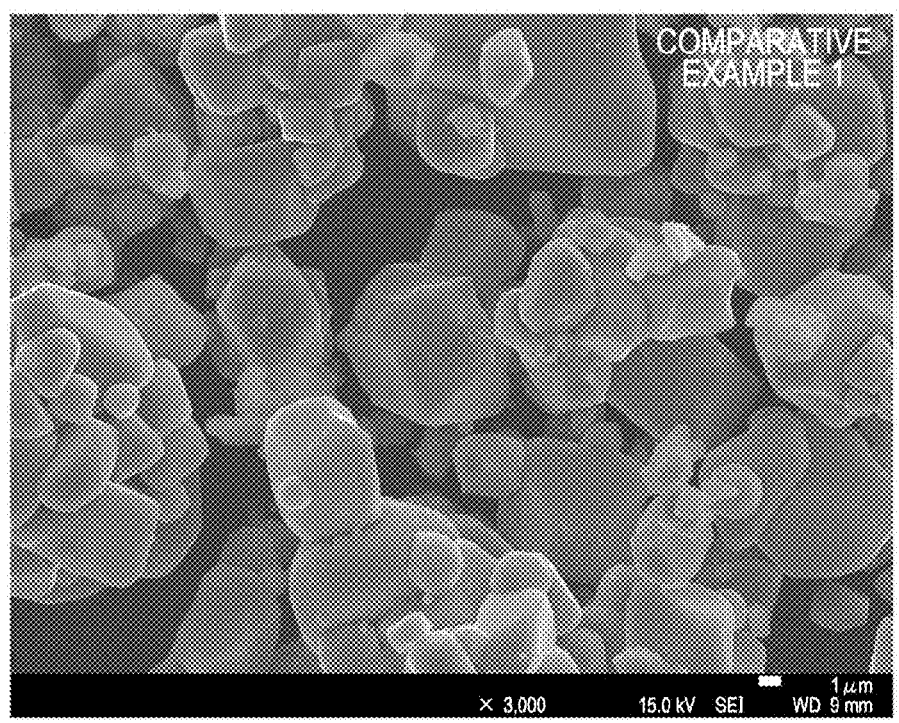
FIG. 6 shows a SEM image of lithium nickel complex oxide prepared in Comparative Example 1.
Figure 7:
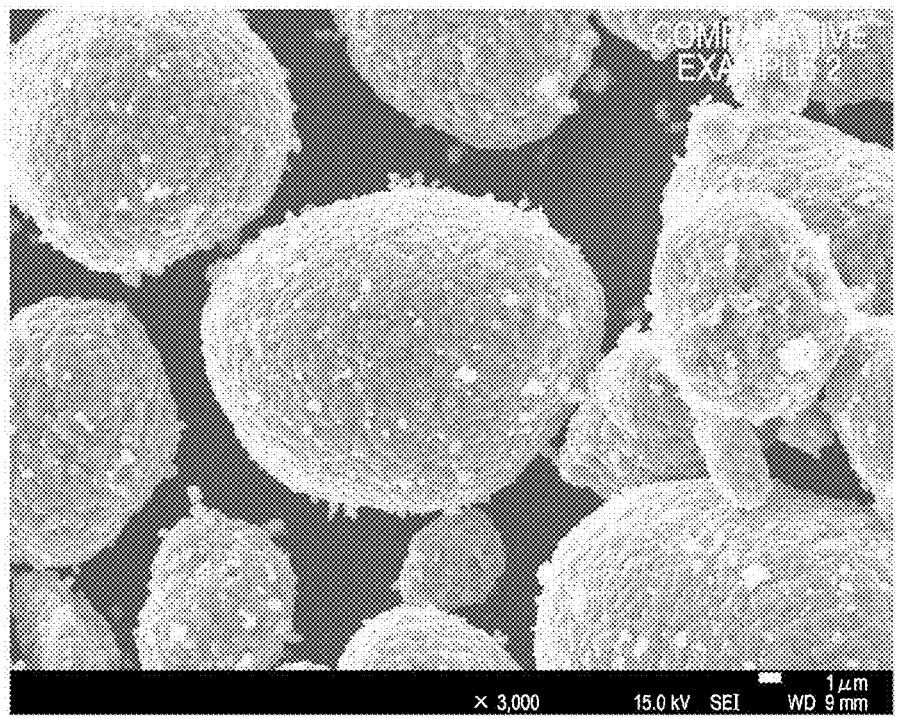
FIG. 7 shows a SEM image of lithium nickel complex oxide prepared in Comparative Example 2.

The layered oxide B1 had contents of the positive electrode active material with a particle size of 3.41 µm or less, 2.27 µm or less, and 1.5 µm or less of 4.1 volume %, 1.50 volume %, and 0.33 volume %, respectively. FIG. 6 shows an image of the layered oxide B1 observed under a SEM. The compressive fracture strength of the layered oxide B1 was 355 MPa.

Comparative Example 2

A layered oxide B2 was prepared in a similar manner to Example 1, except for eliminating the addition of KOH to the mixture of LiOH and NiCoAl complex oxide, and changing the calcination time to 5 hours in the preparation of a positive electrode active material. A positive electrode B2 and a nonaqueous electrolyte secondary battery (test cell B2) were manufactured by using the layered oxide B2.

Similar tests to the tests in Example 1 were performed for the layered oxide B2 and the positive electrode B2. The layered oxide B2 was determined to be a complex oxide represented by a composition formula of $Li_{1.03}Ni_{0.88}Co_{0.09}Al_{0.03}O_2$. As the result of powder X-ray diffraction analysis, the crystal structure of the layered oxide B2 was determined to be a layered rock-salt structure belonging to space group R-3m, and half widths n (2θ) of diffraction peaks corresponding to the (101) plane, the (104) plane, and the (211) plane were 0.143°, 0.161°, and 0.430°, respectively.

Figure 8:
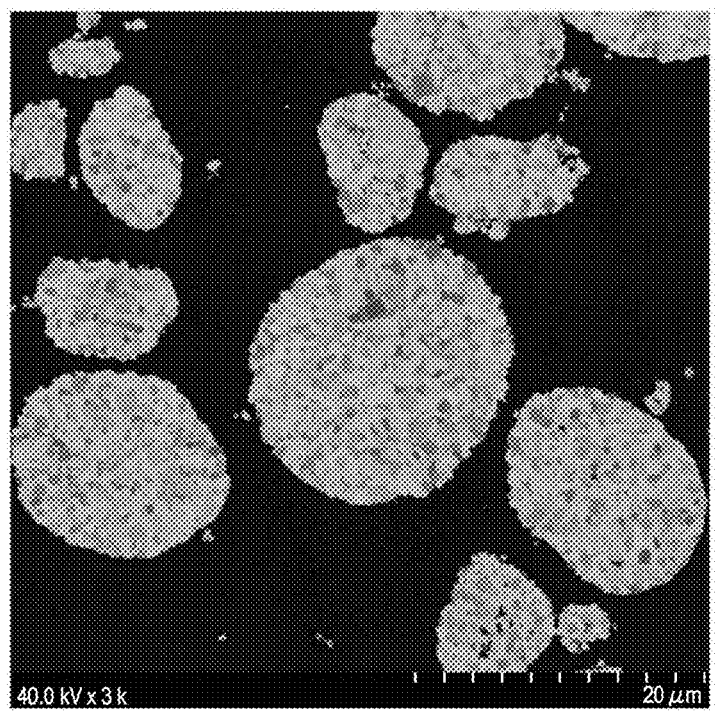
FIG. 8 shows a sectional image, by a SIM, of a positive electrode active material layer of a positive electrode manufactured in Comparative Example 2.

FIG. 8 shows an image of the layered oxide B2 observed under a SEM. The layered oxide B2 had contents of the positive electrode active material with a particle size of 3.41 µm or less, 2.27 µm or less, and 1.5 µm or less of 2.5 volume %, 1.8 volume %, and 0.13 volume %, respectively. The compressive fracture strength of the layered oxide B2 was 114 MPa.

FIG. 8 shows a sectional image obtained by SIM observation of the positive electrode active material layer of the positive electrode B2. In a similar manner to Example 1, the number of single crystal particles of the layered oxide B2 was measured in the sectional image. As the result, the number of single crystal particles (average value) was 45.

[Output Characteristics Test]

At a temperature of 25° C., each test cell manufactured as described above was charged at a constant current of a current value of 0.2 It to a voltage of 4.3 V, and then charged at a constant voltage of 4.3 V to a current value of 0.01 It. Subsequently, each cell was discharged with a discharge cutoff voltage of 2.5 V at a constant current of each current value of 1 It, 0.5 It, 0.2 It, 0.1 It, 0.05 It, and 0.01 It in this order. The potential of a positive electrode active material was determined in a short period of time by performing constant-current discharge at gradually lowered current values as described above. A total value of a capacity value at each current density to 0.01 It was set to be an initial discharge capacity for each test cell.

Next, each test cell underwent charge/discharge cycles repeatedly under the following conditions. The environmental temperature during charging/discharging was set to 25° C. First, constant-current charging was performed at a current value of 0.2 It to a voltage of 4.3 V, and then constant-voltage charging was performed at 4.3 V to a current value of about 0.01 It. Subsequently, constant-current discharging with a discharge cutoff voltage of 2.5 V was performed at a current value of 0.2 It. A 20 minute-pause was each set between charging and discharging. Such a charge/discharge cycle was set as one cycle, a similar test to the initial charging/discharging was performed in every 10 cycles, and 40 cycles were performed by repeating such a procedure four times. A ratio (percentage) of a discharge capacity at the fortieth cycle to the initial discharge capacity was calculated as a capacity retention rate. In terms of such a capacity retention rate, durability (cycle characteristics) of each cell was evaluated.

Table 1 shows, for Example 1, Comparative Example 1, and Comparative Example 2, half widths of diffraction peaks, particle size distribution, and compressive fracture strength for each positive electrode active material, the number of single crystal particles measured in a sectional image of a positive electrode active material layer of each positive electrode, and capacity retention rate of each test cell.

TABLE 1

| | Half width (°) of XRD peak | | | Particle size distribution (volume %) | | | Compressive fracture strength (MPa) | Number of single crystal particles | Capacity retention rate (%) |
|---|---|---|---|---|---|---|---|---|---|
| | (101) plane | (104) plane | (211) plane | 1.5 μm or less | 2.27 μm or less | 3.41 μm or less | | | |
| Ex. 1 | 0.112 | 0.120 | 0.181 | 0 | 0 | 0.26 | 210 | 3 | 97.4 |
| Comp. Ex. 1 | 0.124 | 0.129 | 0.26 | 0.33 | 1.5 | 4.1 | 355 | — | 93.7 |
| Comp. Ex. 2 | 0.143 | 0.161 | 0.43 | 1.3 | 1.8 | 2.5 | 114 | 45 | 90.1 |

FIG. 2 shows X-ray diffraction patterns for layered oxides A1, B1, and B2 obtained in Example 1, Comparative Example 1, and Comparative Example 2, respectively.

As is clear from Table 1, Example 1 and Comparative Example 1, in which a half width of the (104) diffraction peak in the X-ray diffraction pattern is smaller than that of Comparative Example 2, exhibited an enhanced capacity retention rate of the test cells. It is believed that these test cells had a large particle size of single crystal particles of a layered oxide used as a positive electrode active material, thereby suppressing cracking of a positive electrode active material during the cycle test.

As is clear from the comparison between Example 1 and Comparative Example 1, a capacity retention rate was found to be enhanced significantly by decreasing the content of a positive electrode active material with a small particle size even when half widths of the (104) diffraction peak are comparable to each other. It is believed that this is because a low content of a positive electrode active material with a small particle size results in a decreased surface area of the entire positive electrode active material, and thus suppresses side reactions and enhanced reaction homogeneity in the main reaction.

As in the foregoing, durability of a nonaqueous electrolyte secondary battery can be significantly enhanced by including, in a positive electrode, a positive electrode active material that contains lithium nickel complex oxide having a layered rock-salt structure, a specific composition, and a half width n of the (104) diffraction peak in the X-ray diffraction pattern of 0.13° or less, and by setting the content of a positive electrode active material with a particle size of 3.41 μm or less to 2 volume % or less based on the total amount of the positive electrode active material contained in the positive electrode.

INDUSTRIAL APPLICABILITY

The present invention can be employed for nonaqueous electrolyte secondary batteries.

REFERENCE SIGNS LIST

10 Nonaqueous electrolyte secondary battery
11 Positive electrode
12 Negative electrode
13 Separator
14 Electrode assembly
15 Case body
16 Seal
17, 18 Insulating plate
19 Positive electrode lead
20 Negative electrode lead
21 Overhang
22 Filter
22a Opening
23 Lower valve
24 Insulator
25 Upper valve
26 Cap
26a Opening
27 Gasket

The invention claimed is:

1. A nonaqueous electrolyte secondary battery comprising: a positive electrode including a positive electrode current collector and a positive electrode active material layer containing a positive electrode active material; a negative electrode; and a nonaqueous electrolyte, wherein
the positive electrode active material includes lithium nickel complex oxide,
the lithium nickel complex oxide has a layered rock-salt structure, is represented by a composition formula of $Li_xNi_yM_zO_2$ where M is at least one metal element selected from the group consisting of Co, Al, Mg, Ca, Cr, Zr, Mo, Si, Ti, and Fe, and x, y, and z satisfy $0.95 \leq x \leq 1.05$, $0.8 \leq y \leq 1$, $0 \leq z \leq 0.2$, and $y+z=1$, and has a half width n of a (104) diffraction peak in an X-ray diffraction pattern of 0.13° or less, and
content of the positive electrode active material with a particle size of 3.41 μm or less is 2 volume % or less based on a total amount of the positive electrode active material contained in the positive electrode.

2. The nonaqueous electrolyte secondary battery according to claim 1, wherein the positive electrode active material has a compressive fracture strength of 190 MPa or higher.

3. The nonaqueous electrolyte secondary battery according to claim 1, wherein the number of single crystal particles of the lithium nickel complex oxide included in the positive electrode active material that is larger than a circle of 1.7 μm radius is less than 10 in an image of a section of the positive electrode active material layer observed under a scanning ion microscope.

* * * * *